United States Patent
Hwang et al.

(10) Patent No.: US 8,023,086 B2
(45) Date of Patent: Sep. 20, 2011

(54) PAD STRUCTURE OF LIQUID CRYSTAL DISPLAY DEVICE AND FABRICATION METHOD THEREOF

(75) Inventors: Seong Soo Hwang, Gumi-si (KR); Jong A Choi, Seongnam-si (KR); Jong Sung Yim, Seoul (KR)

(73) Assignee: LG Display Co., Ltd., Seoul (KR)

( * ) Notice: Subject to any disclaimer, the term of this patent is extended or adjusted under 35 U.S.C. 154(b) by 432 days.

(21) Appl. No.: 11/159,277

(22) Filed: Jun. 23, 2005

(65) Prior Publication Data

US 2006/0001791 A1 Jan. 5, 2006

(30) Foreign Application Priority Data

Jun. 30, 2004 (KR) .................. 10-2004-0049983

(51) Int. Cl.
G02F 1/1343 (2006.01)
G02F 1/1333 (2006.01)
G02F 1/13 (2006.01)
H01L 21/00 (2006.01)

(52) U.S. Cl. ........ 349/139; 349/138; 349/147; 349/148; 349/187; 438/30

(58) Field of Classification Search .......... 349/46, 349/138, 139, 147, 148, 187; 438/30
See application file for complete search history.

(56) References Cited

U.S. PATENT DOCUMENTS

| | | | | |
|---|---|---|---|---|
| 5,162,933 A * | 11/1992 | Kakuda et al. | ............. | 349/46 |
| 5,671,027 A * | 9/1997 | Sasano et al. | ............. | 349/46 |
| 6,337,520 B1 * | 1/2002 | Jeong et al. | ............. | 257/763 |
| 6,524,876 B1 * | 2/2003 | Baek et al. | ............. | 438/48 |
| 6,734,935 B2 * | 5/2004 | Kim et al. | ............. | 349/114 |
| 7,101,740 B2 * | 9/2006 | Young | ............. | 438/158 |
| 2003/0076452 A1 | 4/2003 | Kim et al. | | |
| 2003/0090604 A1 * | 5/2003 | Song et al. | ............. | 349/56 |
| 2004/0041958 A1 * | 3/2004 | Hwang et al. | ............. | 349/43 |

FOREIGN PATENT DOCUMENTS

| | | |
|---|---|---|
| EP | 1338914 A2 | 8/2003 |
| JP | 09-148586 | 6/1997 |
| JP | 10-240150 | 9/1998 |
| JP | 2002/124680 A | 4/2002 |
| JP | 2002-357844 | 12/2002 |
| JP | 2003-172946 | 6/2003 |
| JP | 2003-195355 | 7/2003 |

* cited by examiner

*Primary Examiner* — Mark Robinson
*Assistant Examiner* — Paisley L Arendt
(74) *Attorney, Agent, or Firm* — McKenna Long & Aldridge, LLP

(57) ABSTRACT

A pad structure of a liquid crystal display (LCD) device and a fabrication method thereof are provided. The pad structure of the LCD device includes: a bottom electrode formed with a predetermined area at one edge side of each of signal lines formed on an array substrate; an insulation layer formed over the bottom electrode; a contact hole for exposing the bottom electrode, the contact hole formed as a predetermined portion of the insulation layer is etched; and a terminal electrode formed over the contact hole, thereby being connected with the bottom electrode, wherein the bottom electrode is formed in a dual structure including an aluminum alloy layer using AlNd and a molybdenum (Mo) layer and a thickness of the Mo layer is greater than at least about one quarter of the thickness of the aluminum alloy layer formed beneath the Mo layer.

2 Claims, 5 Drawing Sheets

PAD STRUCTURE OF LIQUID CRYSTAL DISPLAY DEVICE AND FABRICATION METHOD THEREOF

This application claims the benefit of Korean Patent Application No. 2004-49983, filed on Jun. 30, 2004, which is hereby incorporated by reference for all purposes as if fully set forth herein.

BACKGROUND OF THE INVENTION

1. Field of the Invention

The present invention relates to a liquid crystal display device, and more particularly, to a gate/data pad structure of a liquid crystal display device and a fabrication method thereof.

2. Description of the Related Art

A current progression in information technology has greatly necessitated a flat panel display device that is thinner, lighter and less power-consuming. Among various types of flat panel display devices, a liquid crystal display (LCD) device with excellent color reproducibility has been a recent focus of development.

Generally, the LCD device displays an image by adjusting a degree of light transmission. That is, in the LCD device, two substrates with electrodes thereon are arranged facing each and a liquid crystal material is injected into the two substrates. After injecting the liquid crystal material, a predetermined voltage is supplied to the two electrodes, mobilizing liquid crystals using an electric field created through the supplied voltage for displaying the image.

Hereinafter, a typical structure of a LCD device will be described with reference to the accompanying drawings.

FIG. 1 is an enlarged top view illustrating a portion of an array substrate which is a bottom substrate of a LCD device. In particular, FIG. 1 illustrates an array substrate of a twisted nematic (TN) mode LCD device.

As mentioned above, the bottom substrate 10 is often called an array substrate, and a plurality of thin film transistors T which are switching devices are arranged in a matrix type. There is a plurality of gate lines 25 crossing a plurality of data lines 27 at corresponding thin film transistors T. A pixel region P is defined by the region formed by the crossing of the gate lines 25 and the data lines 27.

A gate pad 29 and a data pad 31 each for receiving a signal from an external source are formed at one edge side of each gate line 25 and each data line 27, respectively. Each of the thin film transistors T includes a gate electrode 21, a source electrode 60, a drain electrode 62, and an active layer 41 disposed above the gate electrode 21. A pixel electrode 91 is formed at the pixel region P.

FIG. 2 illustrates cross-sectional views of the pixel region, a gate pad region and a data pad region taken along lines II-II, III-III and IV-IV depicted in FIG. 1, respectively. The same reference numerals are used for the same configuration elements described in FIG. 1.

As illustrated, the gate electrode 21 made of a conductive material such as a metal is formed on the bottom substrate 10 and is overlaid with a gate insulation layer 30 formed with a material such as silicon nitride or silicon oxide.

The active layer 41 made of amorphous silicon is formed on the gate insulation layer 30, and a pair of ohmic contact layers 51 and 52 is formed on the active layer 41. Herein, the ohmic contact layers 51 and 52 are impurity doped amorphous silicon layers. On top of the pair of ohmic contact layers 51 and 52, the source electrode 60 and the drain electrode 62 made of a conductive material such as a metal are formed. Herein, the source electrode 60, the drain electrode 62, and the gate electrode 21 constitute the thin film transistor T illustrated in FIG. 1.

Next, a passivation layer 70 made of silicon nitride, silicon oxide or an organic insulation material is formed over the source electrode 60 and the drain electrode 62. The passivation layer 70 includes a contact hole 71 exposing the drain electrode 62. The pixel electrode 91 made of a transparent conductive material is formed on the passivation layer 70 and is connected with the drain electrode 62 through the contact hole 71.

Furthermore, the gate line 25 is formed on the bottom substrate 10, and the gate pad 29 is formed with a predetermined area at one edge side of the gate line 25. The gate pad 29 includes: the bottom substrate 10; a gate pad bottom electrode 28; the gate insulation layer 30; the passivation layer 70; a gate pad contact hole 59; and a gate pad terminal electrode 65. More specifically, in the gate pad 29, the gate pad bottom electrode 28 is formed on the bottom substrate 10, and the gate insulation layer 30 is formed over the bottom substrate 10 provided with the gate insulation layer 30. Then, the gate insulation layer 30 and the passivation layer 70 are etched to form the gate pad contact hole 59 exposing the gate pad bottom electrode 28. The gate pad terminal electrode 65 is formed over the gate pad contact hole 59 through which the gate pad terminal electrode 65 is connected with the gate pad bottom electrode 28.

Meanwhile, the data line 27 is formed on the gate insulation layer 30 and extends in a perpendicular direction to the source electrode 60. At one edge side of the data line 27, the data pad 31 is formed with a predetermined area.

Also, as for the data pad 31, the passivation layer 70 formed over the bottom substrate 10 provided with a data pad bottom electrode 32 is etched to form a data pad contact hole 61 exposing the data pad bottom electrode 32. A data pad terminal electrode 67 is formed over the data pad contact hole 61, thereby being connected with the data pad bottom electrode 32.

At this time, predetermined portions of the gate insulation layer 30 and the passivation layer 70 are etched to form the gate pad contact hole 59, whereas a predetermined portion of the passivation layer 70 is etched to form the data pad contact hole 61. In the course of etching these predetermined portions, the gate pad contact hole 59 and the data pad contact hole 61 are sloped steeply.

As described above, the gate pad terminal electrode 65 and the data pad terminal electrode 67 both formed by using indium tin oxide (ITO) or indium zinc oxide (IZO) are patterned respectively on the gate pad bottom electrode 28 and the data pad bottom electrode 32 each formed with a predetermined area at one edge side of the gate line 25 and of the data line 27.

If the gate line 25 and the data line 27 are made of aluminum or an aluminum alloy (AlNd), an oxide layer is formed when the gate pad bottom electrode 28 and the data pad bottom electrode 32 are in contact with the gate pad terminal electrode 65 and the data pad terminal electrode 67, respectively.

The oxide layer hinders the gate pad terminal electrode 65 and the data pad terminal electrode 67 from directly contacting the aluminum-based material used for the gate line 25 and the data line 27 resulting in poor electrical contact. Hence, a buffer layer made of molybdenum (Mo) is formed between the aluminum-based material and each of the gate pad terminal electrode 65 and the data pad terminal electrode 67.

That is, by forming the gate line 25 and the data line 27 as a dual layer of the aluminum-based layer (AlNd) and the molybdenum layer (Mo), it is possible to eliminate the oxide layer generated when the gate line bottom electrode 28 and the data line bottom electrode 32 contact the gate pad terminal electrode 65 and the data pad terminal electrode 67, respectively.

FIG. 3 is a cross-sectional view illustrating a structure of a related art gate pad in detail. The gate pad structure is illustrated as an example; this structure can also be applied to the data pad.

As illustrated, a gate pad bottom electrode 310 is formed on a substrate 300 in a dual structure including an aluminum alloy layer 312 and a molybdenum layer 314. One exemplary material for the aluminum alloy layer 312 is AlNd.

Particularly, the molybdenum layer 314 is formed in a thickness of about 500 Å, while the aluminum alloy layer 312 is formed in a thickness of about 2,000 Å. Also, a thickness of a gate insulation layer 320 formed over the gate pad bottom electrode 310 and that of a passivation layer 330 formed on the gate insulation layer 320 are about 4,000 Å and about 2,000 Å, respectively.

After the formation of the passivation layer 330, a contact hole 340 is formed by performing an etching process for the purpose of making a contact between the gate pad bottom electrode 310 and a gate pad terminal electrode 350.

However, in the course of performing the above related art etching process, over-etching frequently occurs, resulting in a complete removal of the passivation layer 330, the gate insulation layer 320 and the molybdenum layer 314.

That is, if the molybdenum layer 314 is etched through the over-etching, the gate pad terminal electrode 350 made of ITO or IZO makes a direct contact with the aluminum alloy layer 312. As a result, corrosion may occur at an interface between the aluminum alloy layer 312 and the gate pad terminal electrode 350.

In addition, during the related art etching process, predetermined portions of the passivation layer 330 and the gate insulation layer 320 are etched concurrently, causing the contact hole 340 to be sloped steeply. This steeply sloped region of the contact hole 340 is denoted with a reference numeral 360.

Accordingly, when the gate pad terminal electrode 350 is formed over the contact hole 340, a step-coverage characteristic of the gate pad terminal electrode 350 around the steeply sloped region 360 becomes poor, further resulting in a disconnection of the gate pad terminal electrode 350.

Moreover, the aluminum alloy layer 312 of the gate pad bottom electrode 310 may become exposed around the disconnected portion of the gate pad terminal electrode 350, causing a corrosion problem.

SUMMARY OF THE INVENTION

Accordingly, the present invention is directed to a pad structure of a liquid crystal display device and a fabrication method thereof that substantially obviates one or more problems due to limitations and disadvantages of the related art.

An advantage of the present invention is to provide a pad structure of a liquid crystal display device capable of preventing corrosion of a pad by forming a molybdenum layer thicker than about one quarter of the thickness of an aluminum alloy layer both included in a dual structure of the pad and controlling an etching process to form a contact hole with a gradual slope.

Another advantage of the present invention is to provide a method for fabricating a pad structure of a liquid crystal display device capable of preventing corrosion of a pad by forming a molybdenum layer thicker than about one quarter of the thickness of an aluminum alloy layer both included in a dual structure of the pad and controlling an etching process to form a contact hole with a gradual slope.

Additional advantages and features of the invention will be set forth in part in the description which follows and in part will become apparent to those having ordinary skill in the art upon examination of the following or may be learned from practice of the invention. These and other advantages of the invention may be realized and attained by the structure particularly pointed out in the written description and claims hereof as well as the appended drawings.

To achieve these and other advantages and in accordance with the purpose of the invention, as embodied and broadly described herein, a pad structure of a liquid crystal display (LCD) device, includes: a bottom electrode formed on an array substrate with a predetermined area at one edge side of each of signal lines; an insulation layer formed over the bottom electrode; a contact hole for exposing the bottom electrode, the contact hole formed as a predetermined portion of the insulation layer is etched; and a terminal electrode formed over the contact hole, thereby being connected with the bottom electrode. The bottom electrode is preferably formed in a dual structure including an aluminum alloy layer using AlNd and a molybdenum (Mo) layer and a thickness of the Mo layer is greater than at least about one quarter of the thickness of the aluminum alloy layer formed beneath the Mo layer.

In another aspect of the present invention, there is provided a method for fabricating a pad structure of a liquid crystal display (LCD) device, including: forming a bottom electrode with a predetermined area at one edge side of each of signal lines formed on an array substrate; forming an insulation layer over the bottom electrode; etching a predetermined portion of the insulation layer to form a contact hole for exposing the bottom electrode; and forming a terminal electrode over the contact hole such that the terminal electrode is connected with the exposed bottom electrode, wherein forming a bottom electrode is in a dual structure including an aluminum alloy layer and a molybdenum (Mo) layer and a thickness of the Mo layer is greater than at least about one quarter of the thickness of the aluminum alloy layer formed beneath the Mo layer.

In a further aspect of the present invention, there is provided a pad structure of a liquid crystal display (LCD) device, including: a bottom electrode being formed on an array substrate with a predetermined area at one edge side of each of signal lines and including a dual structure of a top metal layer and a bottom metal layer; an insulation layer formed over the bottom electrode; a contact hole for exposing the bottom electrode, the contact hole formed as a predetermined portion of the insulation layer is etched; and a terminal electrode formed over the contact hole, thereby being connected with the top metal layer.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention.

In the drawings.

DETAILED DESCRIPTION OF THE ILLUSTRATED EMBODIMENTS

Reference will now be made in detail to embodiments of the present invention, examples of which are illustrated in the accompanying drawings. Wherever possible, the same reference numbers will be used throughout the drawings to refer to the same or like parts.

Figure 4:
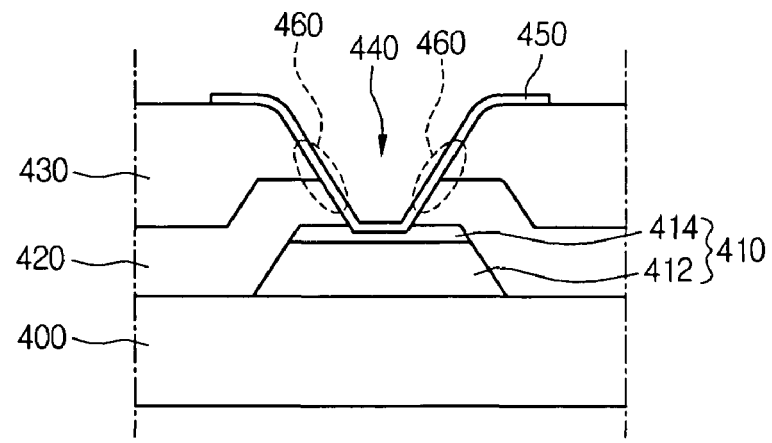
FIG. 4 is a cross-sectional view illustrating a pad structure of a liquid crystal display device in accordance with a illustrated embodiment of the present invention.

FIG. 4 is a cross-sectional view illustrating a pad structure of a liquid crystal display device in accordance with a illustrated embodiment of the present invention.

Figure 1:
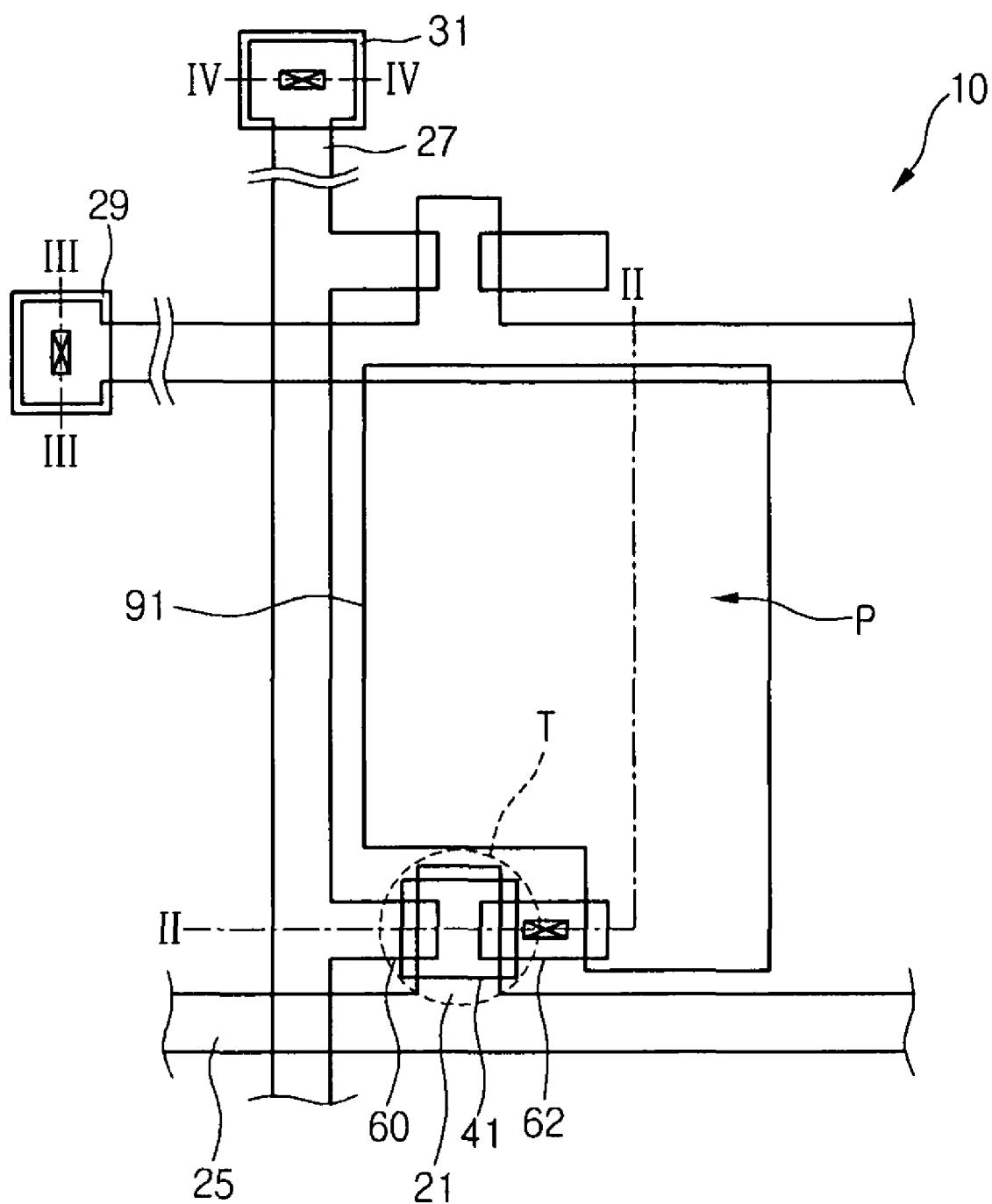
FIG. 1 is an enlarged top view illustrating a portion of an array substrate which is a bottom substrate of a typical liquid crystal display device.

Although the pad structure illustrated in FIG. 4 is a gate pad structure, it is still possible to apply this pad structure identically to a data pad structure. Also, since an array substrate structure of the liquid crystal display according to the illustrated embodiment of the present invention is identical to that described in FIGS. 1 and 2, detailed description of the array substrate structure will be omitted.

In accordance with the illustrated embodiment of the present invention, a plurality of gate lines are formed on the array substrate and, the gate pad is formed at one edge side of each gate line with a predetermined area.

In more detail of the gate pad, a bottom electrode 410 of the gate pad is formed on a substrate 400 and then, a gate insulation layer 420 and a passivation layer 430 are sequentially formed over the bottom electrode 410. Afterwards, a portion of the passivation layer 430 and the gate insulation layer 420 is etched to form a contact hole 440 exposing the bottom electrode 410. Subsequently, a terminal electrode 450 of the gate pad is formed over the contact hole 440, thereby completing the formation of the gate pad. The terminal electrode 450 is connected with the bottom electrode 410 through the contact hole 440.

Also, the bottom electrode 410 has a dual structure including an aluminum alloy layer 412 and a molybdenum (Mo) layer 414 to prevent an oxide layer from being formed when the bottom electrode 410 contacts the terminal electrode 450. One exemplary material for the aluminum alloy layer 412 is AlNd.

In particular, in order to prevent a frequent incidence of over-etching usually arising when an etching process is performed to form the contact hole 440, the molybdenum layer 414 is formed more thickly than the typically formed Mo layer of the gate pad structure. That is, in the typical gate pad structure, a thickness of the molybdenum layer and that of the aluminum alloy layer are about 500 Å and 2,000 Å, respectively. On the other hand, the molybdenum layer 414 according to the illustrated embodiment of the present invention has a thickness ranging from about 500 Å to about 1,000 Å.

In other words, the thickness of the molybdenum layer 414 is greater than about one quarter of the thickness of the aluminum layer 412 formed beneath the molybdenum layer 414; as a result, even though the over-etching takes place during the formation of the contact hole 440, the whole molybdenum layer 414 is not etched. This impairment of the over-etching makes it further possible to prevent corrosion of the gate pad.

Also, as described above, in the course of forming the contact hole in the related art gate pad structure, there is a problem in that the contact hole becomes steeply inclined because the passivation layer and the gate insulation layer are concurrently etched. Thus, the terminal electrode of the gate pad is formed over this steeply inclined contact hole with a poor step coverage characteristic, causing a problem in that the gate pad terminal electrode becomes disconnected.

To solve this problem, the etching process for forming the contact hole 440 is carried out by adding a predetermined reaction gas capable of reducing a slope 460 of the contact hole 440 to a main etch gas, which is silicon nitride ($SiN_x$) gas. Alternative to this addition of the predetermined reaction gas, an ashing process is consecutively performed after the etching process. As a result of this specific treatment, as illustrated in FIG. 4, the slope 460 of the contact hole 440 becomes gradual and thus, the electrode disconnection defect does not occur during the formation of the terminal electrode 450.

Figure 5A:
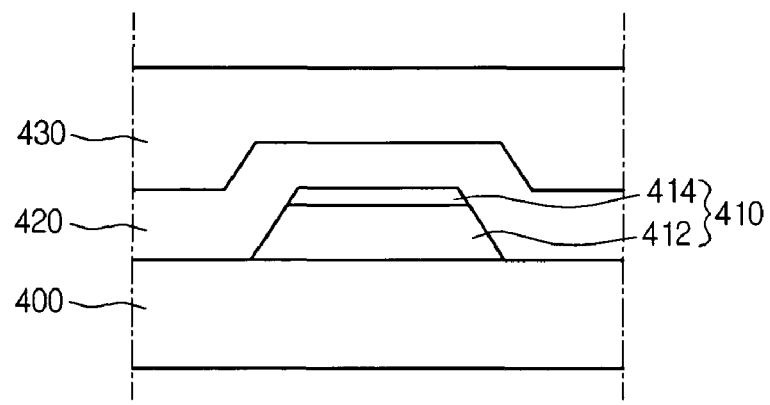
FIGS. 5A to 5C are cross-sectional views illustrating a method for fabricating a pad structure of a liquid crystal display device in accordance with the illustrated embodiment of the present invention.
Figure 5B:
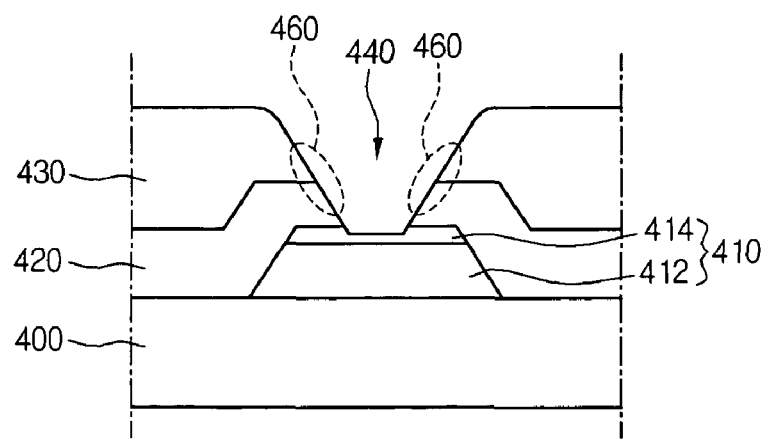
Figure 5C:
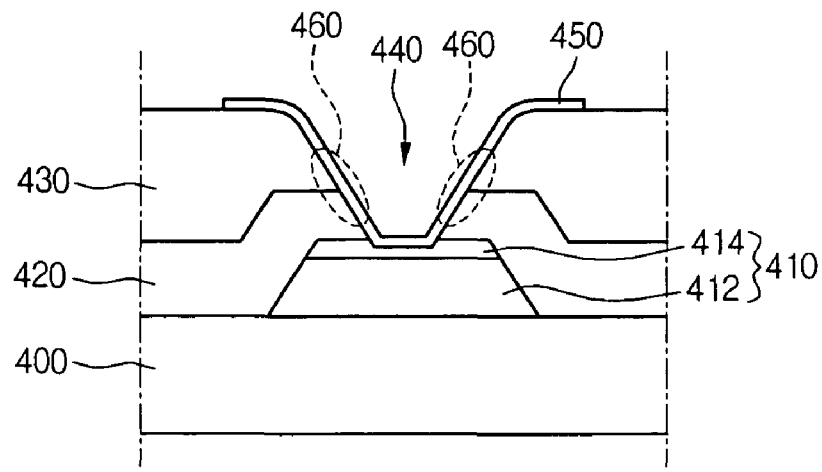

FIGS. 5A to 5C are cross-sectional views illustrating a method for fabricating a pad structure of a liquid crystal display device in accordance with the illustrated embodiment of the present invention.

Although the illustrated pad structure is a gate pad structure, it is still possible to apply this pad structure identically to a data pad structure. Also, since an array substrate structure of the liquid crystal display according to the illustrated embodiment of the present invention is identical to that described in FIGS. 1 and 2, detailed description of the array substrate structure will be omitted.

Referring to FIG. 5A, a bottom electrode 410 is formed on an array substrate 400 with a predetermined area at one edge side of each gate line. On top of the bottom electrode 410, a gate insulation layer 420 and a passivation layer 430 are sequentially formed.

Herein, the bottom electrode 410 is formed in a dual structure including an aluminum alloy layer 412 and a molybdenum (Mo) layer 414. One exemplary material for the aluminum alloy layer 412 is AlNd. Also, the molybdenum layer 414 is formed in a thickness greater than about one quarter of the thickness of the aluminum alloy layer 412 but less than about one half of the thickness of the aluminum alloy layer 412. For instance, preferably, the thickness of the aluminum alloy layer 412 is about 2,000 Å, while that of the molybdenum layer 414 ranges from about 500 Å to about 1,000 Å. The reason for this specific thickness of the molybdenum layer 414 is to prevent the aluminum layer 412 from being exposed even in the case that the molybdenum layer 414 is over-etched during an etching process for forming a subsequent contact hole.

More specific description of the dual structure of the bottom electrode 410 will be provided with reference to FIGS. 6A to 6E.

Referring to FIG. 5B, the passivation layer 430 and the gate insulation layer 420 are etched to form the aforementioned contact hole 440 exposing the bottom electrode 410. At this time, to reduce a slope 460 of the contact hole 440, the etching process is carried out by adding a predetermined reaction gas capable of reducing the slope 460 of the contact hole 440 to an etch gas of silicon nitride ($SiN_x$). Alternative to this addition of the reaction gas, an ashing process is carried out consecutively after the etching process.

Referring to FIG. 5C, after the formation of the contact hole 440, a terminal electrode 450, which is a transparent electrode formed by using a material such as indium tin oxide (ITO) or indium zinc oxide (IZO), is formed over the contact hole 440, thereby completing the gate pad formation.

FIGS. 6A to 6E are cross-sectional views illustrating sequential processes for forming a bottom electrode of a gate pad in a dual structure including an aluminum-based layer and a molybdenum layer in accordance with the illustrated embodiment of the present invention.

Also, it should be noted that the dual structure of the aluminum alloy layer using AlNd and the molybdenum (Mo) layer is exemplified as one illustrated embodiment of the present invention. Therefore, the foregoing description of sequential processes is not merely limited to the formation of such dual structure.

Figure 6A:
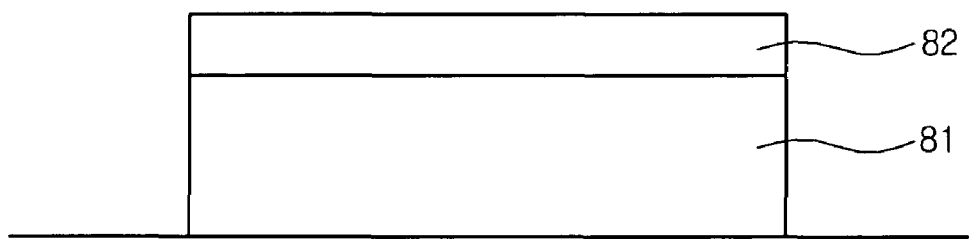
FIGS. 6A to 6E are cross-sectional views illustrating sequential processes for forming a bottom electrode of a pad in a dual structure including an aluminum-based layer and a molybdenum (Mo) layer in accordance with the illustrated embodiment of the present invention.

Referring to FIG. 6A, an aluminum-based layer 81 with a low level of resistance is formed on a substrate in a gate pad region. Herein, an alloy of aluminum such as AlNd is one exemplary material for the aluminum-based layer 81. Afterwards, a metal layer 82 is formed on the aluminum-based layer 81 by using a material selected from a group consisting of Mo, chromium (Cr) and tungsten (W).

Figure 6B:
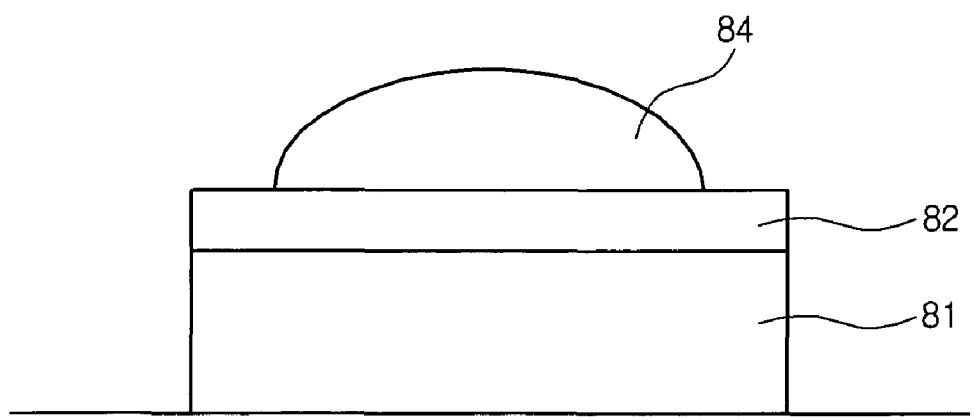

Referring to FIG. 6B, a photoresist pattern 84 is formed on the metal layer 82 and the aluminum-based layer 81 to obtain a bottom electrode of a gate pad. Although not illustrated, a photoresist layer is first formed on the metal layer 82 and then, photo-exposed and developed with use of a mask, thereby obtaining the photoresist pattern 84.

Figure 6C:
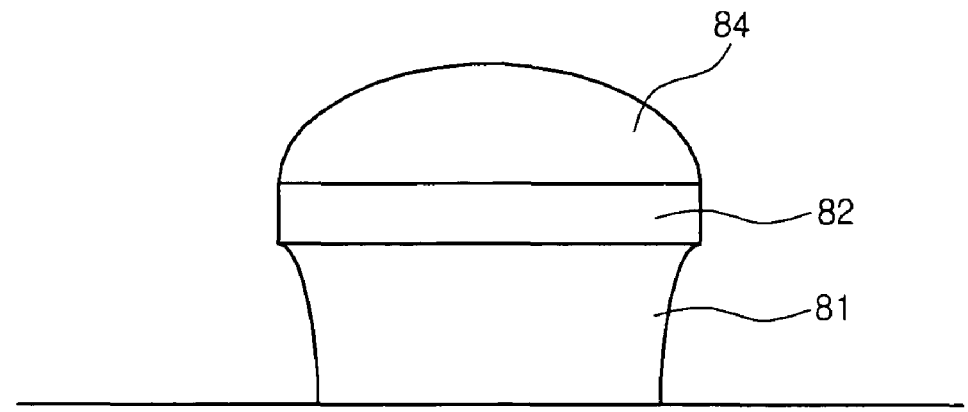

Referring to FIG. 6C, an etching process is subsequently carried out to obtain an intended pattern. For such etching process, a wet etching process is performed. However, a wet etching solution for etching the metal layer 82, i.e., the Mo layer, causes corrosion of the bottom electrode of the gate pad due to a transition phenomenon arising between the molybdenum layer 82 and the aluminum-based layer 81, i.e., the AlNd layer.

Such corrosion phenomenon is generally called Galvanic corrosion. In more detail of the Galvanic corrosion, when these Mo layer 82 and the AlNd layer 81 are dipped into the wet etching solution, there exists an electric potential difference which subsequently causes transition of electrons between the Mo layer 82 and the AlNd layer 81.

Figure 2:
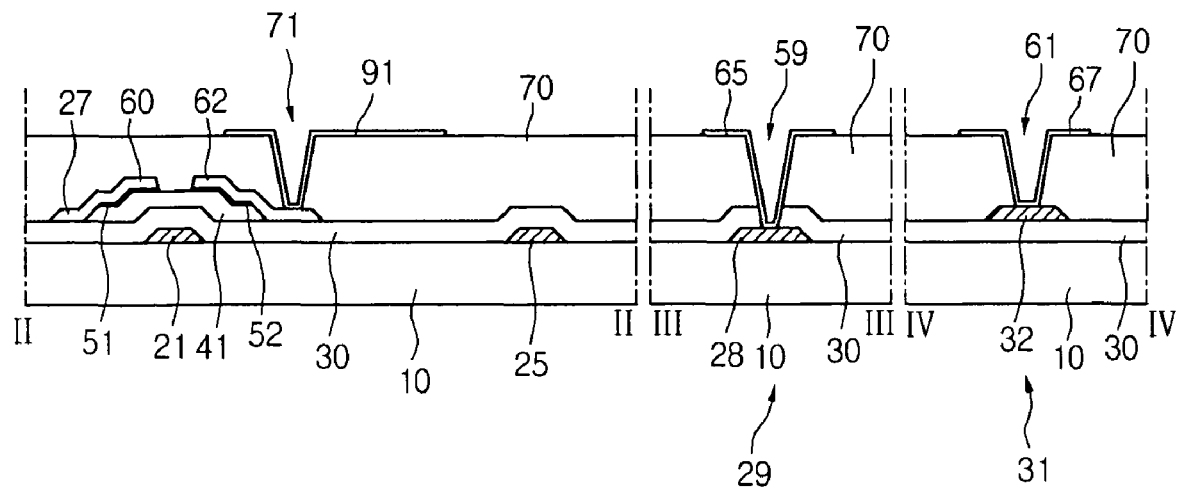
FIG. 2 illustrates cross-sectional views taken along lines II-II, III-III and IV-IV depicted in FIG. 1, respectively.
Figure 3:
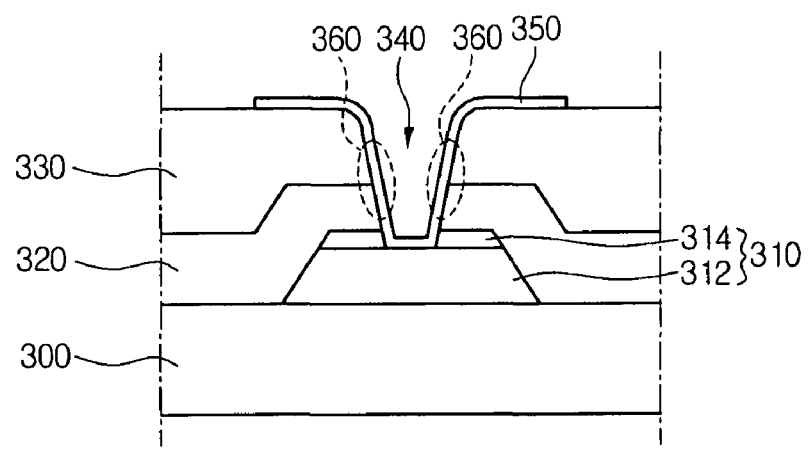
FIG. 3 is a cross-sectional view illustrating a structure of a typical gate pad in detail.

Therefore, because of the Galvanic corrosion, as illustrated in FIG. 6C, sidewalls of the aluminum-based layer 81 are depressed, causing a poor step-coverage characteristic when the gate insulation layer 30 and the passivation layer 70 illustrated in FIG. 2 are formed.

Figure 6D:
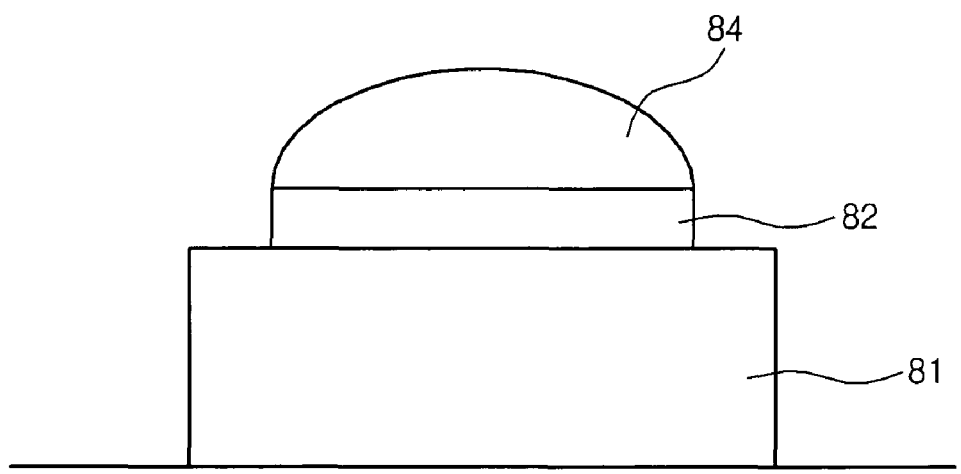

To solve the above-described problem, as illustrated in FIG. 6D, the wet etching process is followed by a dry etching process performed on a boundary region between the photoresist pattern 84 and the metal layer 82. As a result of this dry etching process, a portion of the metal layer 82 is removed, so that the gate insulation layer 420 and the passivation layer 430 are formed with a good step-coverage characteristic as illustrated in FIG. 4.

Figure 6E:
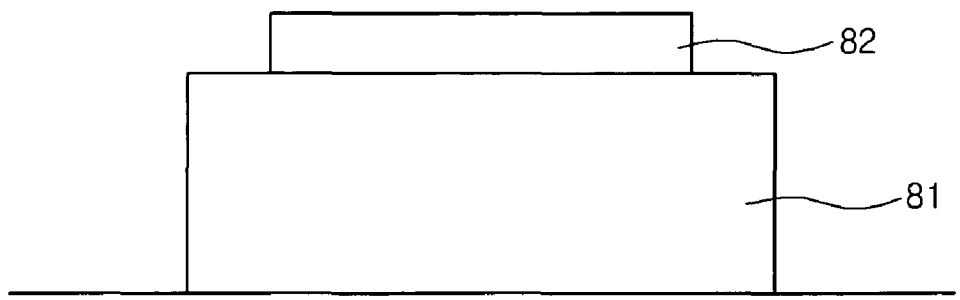

Referring to FIG. 6E, the photoresist pattern 84 is removed, thereby obtaining the dual structure of the bottom electrode including the aluminum alloy layer 81 using AlNd, and the molybdenum (Mo) layer according to this illustrated embodiment.

In accordance with the illustrated embodiment of the present invention, in the dual structure of the pad bottom electrode, the molybdenum layer is formed with a thickness greater than at least about one quarter of the thickness of the aluminum alloy layer. Hence, it is possible to prevent corrosion of the aluminum alloy layer.

In addition, the etching process for forming the contact hole exposing the pad bottom electrode is controlled to decrease the slope of the contact hole. This decrease in the slope of the contact hole provides an effect of preventing the terminal electrode of the pad generally connected with the bottom electrode from being disconnected and another effect of preventing corrosion of the pad at the contact site.

It will be apparent to those skilled in the art that various modifications and variations can be made in the present invention. Thus, it is intended that the present invention covers the modifications and variations of this invention provided they come within the scope of the appended claims and their equivalents.

What is claimed is:

1. A method for fabricating a liquid crystal display (LCD) device, comprising:

providing a first substrate and a second substrate;

forming a pad structure on one of said first and second substrates;

said forming a pad structure comprising:

forming a bottom electrode with a predetermined area at one edge side of each of signal lines formed on said substrate;

forming a gate insulation layer and an insulation layer over the bottom electrode, the insulation layer formed of an organic insulation material;

etching a predetermined portion of the gate insulation layer and the insulation layer to form a contact hole for exposing the bottom electrode, wherein forming the contact hole consecutively performs an ashing process to the gate insulation layer and the insulation layer, after the etching process of the gate insulation layer and the insulation layer, to decrease a slope of the contact hole; and forming a terminal electrode over the sloped contact hole such that the terminal electrode is connected with the exposed bottom electrode, wherein forming the bottom electrode is in a dual structure including an aluminum alloy layer and a molybdenum (Mo) layer and a thickness of the Mo layer is greater than at least about one quarter of the thickness of the aluminum alloy layer formed beneath the Mo layer, said forming the bottom electrode comprising:

forming the aluminum alloy layer, forming the molybdenum (Mo) layer on the aluminum alloy layer, forming photoresist pattern on the molybdenum (Mo) layer, performing a wet etching process, and patterning the molybdenum (Mo) layer and the aluminum alloy layer;

performing a dry etching process for the photoresist pattern, the molybdenum (Mo) layer and the aluminum alloy layer to remove a portion of the molybdenum (Mo) layer on a boundary region of the molybdenum (Mo) layer, and removing the photoresist pattern, wherein a groove in the molybdenum (Mo) layer is formed by an over-etching in the step of etching to form the contact hole, wherein one part of the terminal electrode is disposed in the groove.

2. The method as claimed in claim 1, wherein said etching of the gate insulation layer and the insulation layer to form the contact hole is concurrently performed.

* * * * *